United States Patent Office 2,783,676
Patented Mar. 5, 1957

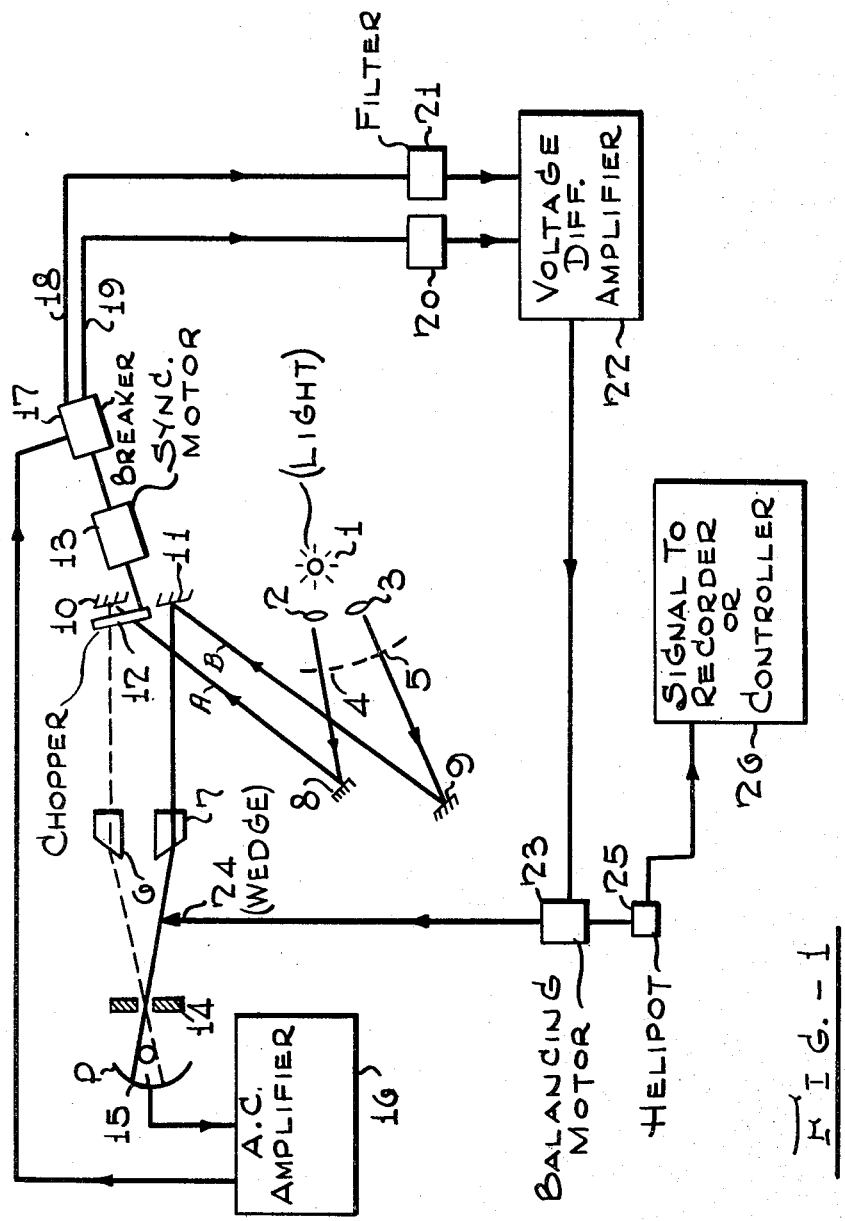

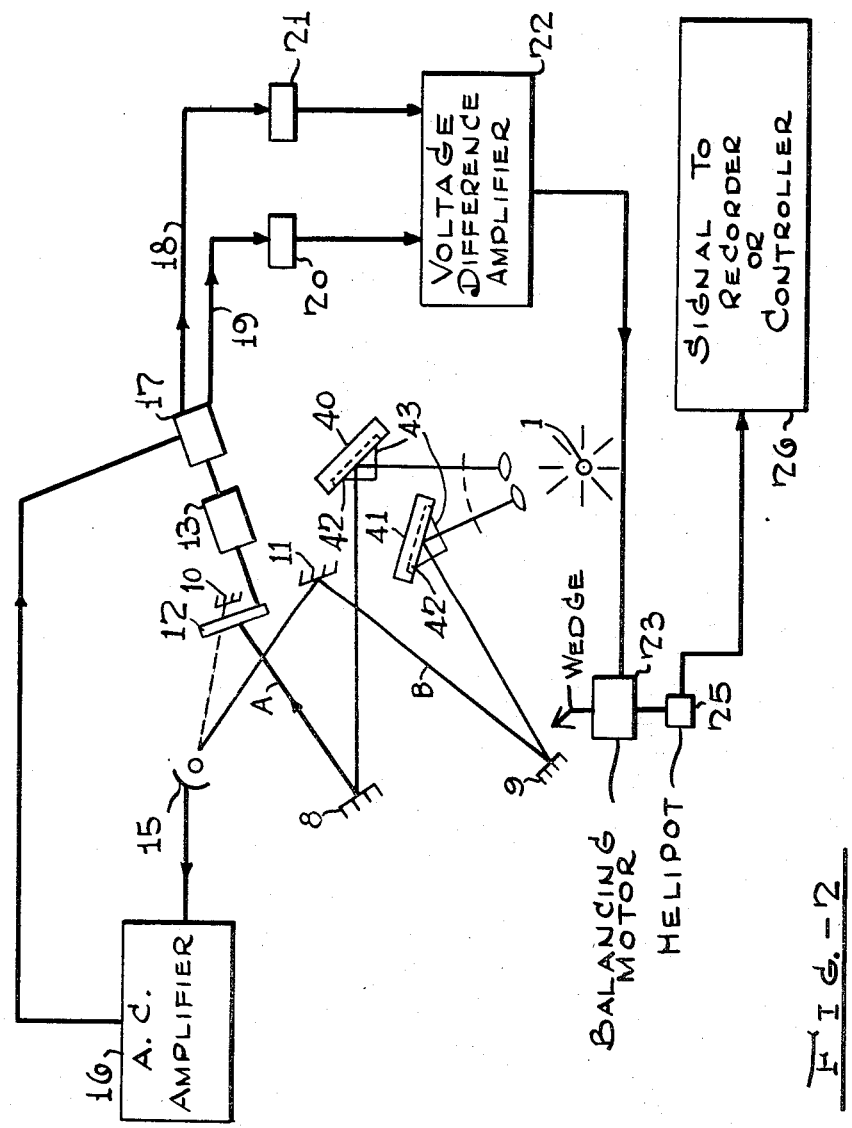

2,783,676

APPARATUS FOR DETERMINING DIFFERENCES IN REFRACTIVE INDEX

Keith P. Lanneau and Elphege M. Charlet, Baton Rouge, La., assignors to Esso Research and Engineering Company, a corporation of Delaware Application July 9, 1952, Serial No. 297,972

6 Claims. (Cl. 88—14)

This invention concerns a novel apparatus for analytical and process control applications. The invention concerns the determination of the refractive index of a fluid at two different wave lengths, to implement the discovery that selective analytical results may often be obtained by determining the difference between the refractive indexes of a fluid at two different wave lengths.

While the present invention is of broad application, by way of example the invention may be considered as applied to the analysis of a complicated mixture of hydrocarbons. The invention is particularly effective in determining the total concentration of single ring aromatic hydrocarbons in hydrocarbon mixtures containing paraffins and napthenes as well. Such an analysis cannot be made by refractive index determinations alone. Thus, in the case of hydroformate gasoline containing paraffins, naphthenes and aromatics, the refractive indexes of paraffins present are approximately 1.39 and the refractive indexes of single ring aromatics are approximately 1.49. The difference in the general refractive indexes of these two constituents is therefore only about 0.10. However, individual paraffins vary in refractive index from about 1.37 to 1.42, representing a variation of about 0.05 or an amount equal to ½ the difference between the indexes of paraffins and aromatics referred to. It is apparent from these figures that the concentration of aromatic hydrocarbons could not accurately be determined by refractive index determinations, since variations in the concentration and type of paraffins present could affect the results as greatly as differences in aromatic concentration.

It may be observed that similar difficulties are encountered in other conventional physical analysis methods. Dielectric constant measurements are subject to the same disadvantages pointed out in connection with refractive index determinations. Ultraviolet absorption methods are unsatisfactory due to interference caused by the intense adsorption of polynuclear aromatics, which are present in small amounts in hydroformates or catalytic gasolines (0 to 0.5%).

It has been found however, that selective analytical results can be obtained by determination of a property herein referred to as "optical dispersion." By definition, optical dispersion is employed to define the difference in the values of refractive index determined at two different wave lengths. In the determination of total aromatics in a hydrocarbon mixture the wave lengths chosen are those of the hydrogen F line and the hydrogen C line in the electro-magnetic spectrum. In other words, in determining optical dispersion, the refractive index of a fluid is determined at two different wave lengths, which may be those suggested. The difference between the refractive index at these two wave lengths is identified as the optical dispersion. The value of optical dispersion for hydrocarbon mixtures has been found to be relatively insensitive to changes in the relative concentrations of naphthenes and paraffins, but is sensitive to differences in the concentration of mononuclear aromatic hydrocarbons.

For example, the optical dispersion, expressed as $10^4$ times the difference between the refractive indices at the hydrogen F and C lines, of individual paraffins, and napthenes has been found to be about 72 with little variation among the different paraffins and naphthenes. Mononuclear aromatic hydrocarbons have a value of optical dispersion of about 155. Actually, individual paraffins or naphthenes will vary by about plus or minus 2 from the value stated, while individual mononuclear aromatic compounds will vary by about plus or minus 5. Since the total difference in optical dispersion between paraffins and aromatics is about 83, it may be seen that these variations in individual compounds are not sufficient to seriously affect the accuracy of analytical results. While the greatest magnitude of error which could conceivably be encountered, has been indicated, it should be noted that in typical analysis problems, analyses are generally correct to about plus or minus 2%. Whereas polynuclear aromatics interfere by a factor almost equal to the number of condensed rings, the interference is less than in the case of the other methods mentioned above.

In determining optical dispersion therefore, apparatus is required to determine the refractive index of a fluid at two different wave lengths, and to then determine the difference in the values of refractive index at these two wave lengths. Illustrated in the accompanying drawings are two forms of apparatus which may be used for this purpose, in which:

Figure 1 illustrates an apparatus in which two beams of monochromatic energy of different wave length are passed through two prismatic sample cells in combination with a single detector and associated equipment to determine the difference in refractive index at the two wave lengths; and;

Figure 2 illustrates a preferred form of apparatus in which two beams of monochromatic energy of different wave length are each internally reflected from a fluid sample at an interface between the sample and a prism, so that the variation in intensity of the internally reflected light beams may be used to provide the value of refractive indices of the two different wave lengths.

Referring to the drawings in detail, in the apparatus of Figure 1, a single source of white light 1 such as a tungsten source may be employed. Two beams of radiation from the source, and which are designated in the drawing by the letters A and B may be collimated by lenses 2 and 3, so as to pass through two interference filters 4 and 5. In an alternate scheme a single collimated beam may be split into two beams by a half-silvered beam splitting prism. Each of the interference filters are of the narrow band type having a peak transmission at two different wave lengths chosen with regard to the particular analytical requirements. In the case of the determination of total aromatics in a hydrocarbon mixture, one filter may have a peak transmission at about 450 millimicrons, while the other filter may have a peak transmission at about 700 millimicrons. The two beams of radiation passing through filters 4 and 5 are thus substantially monochromatic, having a wave length respectively of about 450 and 700 millimicrons. These two beams of monochromatic radiation of different wave lengths are then directed to pass through two sample cells 6 and 7, each containing a sample of the fluid to be characterized. For this purpose the beams of radiation may be reflected from mirrors 8 and 9 and mirrors 10 and 11 to, and through, the sample cells. Each of the sample cells 6 and 7 are prismatic in character having non-parallel entrance and exit windows. It is suitable for the entrance and exit windows of the sample cells to have an angle of about 10° to 90° with respect to each other, depending on the refractive index range of the samples. In a preferred form of the invention, in order to permit utilization of a single detector, at some portion of the path of each of the beams of energy, the two beams are periodically interrupted. Thus, in the drawing, a "chopper" 12 is illustrated, driven by a synchronous motor 13 so as to sequentially and periodically interrupt the two beams of radiation. This is carried out so as to pulse the two beams of radiation 180° out of phase. Thus, for example, a semicircular chopping disc may be employed in the system illustrated. The frequency of pulsing is not critical, but is preferably in the range of about 10 to 30 cycles per second. As shown in the drawing, the beam A has been interrupted by the chopper 12. The path followed by this beam when not so interrupted is shown by a broken line.

In this arrangement the sample cells are to be arranged as shown so as to direct the pulsed radiation passing through each cell towards and through a common slit 14. Each of the refracted pulsed beams of radiation will be partially blocked by opposite edges of the slit 14 before falling on the surface of the detector 15. More or less of each beam of radiation will be blocked by the slit depending upon the refractive index of the sample through which the radiation is passed. It is suitable to employ slit widths of about 3 to 20 mm. Detector 15 may constitute a photocell having suitable response to the particular wave lengths of energy selected. As a result an electrical signal will be developed by photocell 15 constituting a pulsating or A. C. electrical voltage which may be amplified by the A. C. amplifier 16. The A. C. pulses supplied to and amplified by the amplifier will correspond to the two pulsed beams of radiation, being 180° out of phase. The amplified A. C. pulses are then conducted to a mechanical breaker arrangement 17 operative to sort out the electrical pulses contributed by each of the individual beams of radiation. A simple and effective means of accomplishing this is to employ a rotary switch of the single pole double throw type. (180° on, and 180° off.) By driving this switch by the shaft of the synchronous motor, the breaker may be precisely synchronized with the two pulsed beams of radiation. Thus a first series of pulses may be derived from breaker 17 through electrical line 18 corresponding to the electrical signal picked up by the detector as a result of transmission of energy through sample cell 6. A second series of electrical pulses will be provided through lead 19, corresponding to transmission of energy through sample cell 7. Each of these signals are then filtered by filters 20 and 21 to provide D. C. signals varying in magnitude in accordance with the amount of radiation in each of the two beams passing the slit 14. These D. C. signals are preferably supplied to a voltage difference amplifier 22 in which the two signals are bucked, so as to provide an output signal corresponding to the difference in voltage between the signals supplied. In many cases it is suitable to directly record the voltage difference in order to obtain the desired optical dispersion. However, it is preferred to provide a null system so that the voltage difference output of amplifier 22 is preferably supplied to a servomotor 23 which is used to drive a shutter element 24. The servo or balancing motor 23 is mechanically arranged to drive shutter or wedge element 24 into or out of one of the two beams of radiation so that no different voltage will be developed by amplifier 22. A Helipot 25 may be coupled to the shaft of the balancing motor 23 in a manner to determine the rotation of the balancing motor required to maintain the null response. The signal from the Helipot is then conducted to a recorder 26 which may be directly calibrated in terms of optical dispersion. As will be understood, the Helipot constitutes a potentiometer arranged in a battery circuit so that rotation of the balancing motor will move the wiper of the potentiometer to provide a signal proportional to rotation of the balancing motor. This signal is therefore proportional to the difference in voltage developed by the two beams of radiation falling on the detector. Again this signal is proportional to the difference in the refractive indexes of the sample at the two monochromatic wave lengths employed.

It is apparent that the apparatus of Figure 1 may be modified in various ways. For example, by employing two separate slits of the character of slit 14 and by employing two detector systems it is not necessary to employ the chopper described. Again, as indicated, a null system is not required but is preferred.

Referring now to Figure 2, an alternative and preferred arrangement for determining optical dispersion is illustrated. The apparatus of Figure 2 is in many respects similar to the apparatus of Figure 1 and corresponding elements are identified by the same numbers. The essential difference in the apparatus concerns the nature of the sample cells in which the sample is contained in the two beams of monochromatic energy. In the apparatus of Figure 2, two sample cells 40 and 41 are employed in which the sample is contained in a cavity 42 in a suitable receiver so as to have a surface abutting one surface of a prism 43 supported by the receiver. Radiation is directed towards the prism so as to be refracted towards the sample surface. Radiation internally reflected by the sample at the interface between the abutting prism and sample surfaces is then redirected outwardly from the prism in the general path illustrated. In this case the angle of the refracted light beam at the surface of the prism will not be altered by the refractive index of the fluid sample, but rather the intensity of the light beam will be varied in proportion to the refractive index of a sample. If desired, each sample cell may be provided by placing a transparent window element over a cavity formed in a receiver element so as to provide interfacial contact with the surface of a sample in the cavity and by placing a prism on the window. As a result, in the apparatus of Figure 2, a slit such as employed in Figure 1 is not required. The remaining elements of the apparatus are of the same nature and are employed as described in connection with Figure 1.

As described therefore, this invention concerns an analytical method in which the difference in refractive index of a sample at two different wave lengths is determined. While different wave lengths may be employed, in the case of the determination of total aromatic hydrocarbons in a hydrocarbon mixture, the wave lengths employed are preferably about 450 and 700 millimicrons. In one form of apparatus which may be employed in determining this difference in refractive index, monochromatic beams of energy of each of the chosen wave lengths is passed through two prismatic sample cells through a common slit onto a single detector. Each of the beams of energy are pulsed 180° out of phase and the detector signals are filtered in a manner to provide a D. C. voltage proportional to the difference in the amount of radiation in each of the two beams falling on the detector. This signal is then directly recorded or employed to operate a servomotor to partially block one of the beams to provide a null detection system.

As described in a preferred form of the invention each of the two beams of monochromatic energy is refracted by a prism to an interface of the fluid sample. The intensity of internally reflected radiation from the sample is determined by the detecting system described.

What is claimed is:

1. An apparatus for determining the refractive characteristic of a fluid material, which comprises means for directing each of two monochromatic radiation beams of different wave lengths along separate paths; radiation sensitive means disposed in the path of each said radiation beam, said radiation sensitive means being the terminal end of each said path, and being adapted to receive and convert radiant energy of each beam into electrical energy to produce an electrical output signal representative of said radiation energy received thereby; a pair of receivers, each adapted to contain a portion of said fluid material, and each adapted and disposed to expose said fluid material contained thereby to incidence of one of said monochromatic radiation beams, whereby each monochromatic radiation beam is substantially redirected along its path after contact with said fluid material, and the radiation energy of each beam received by said radiation sensitive means substantially is modulated as a result of said contact of said beam with said fluid material; and an electrical system including means connected to said radiation sensitive means to transmit the output signals representative of the radiation energy of each beam, in periodic sequence and 180° out of phase, electrical signal integration means connected to said signal transmission means and adapted to receive and combine output signals from said radiation sensitive means to provide a net electrical signal output representative of the net radiation energy of said beams, and means to exhibit said net signal output of said integration means.

2. An apparatus according to claim 1, wherein said means to exhibit said net signal output from said signal integration means includes a servomotor energized by said net signal output, and a shutter means for attenuating one of said beams, said shutter means being operatively connected to and actuated by said servomotor.

3. An apparatus for determining the refractive characteristic of a fluid material, which comprises means for directing two monochromatic radiation beams of different wave lengths along separate and convergent paths; a radiation sensitive means disposed substantially in and common to the paths of both beams beyond their convergence, said radiation sensitive means being substantially the terminal end of both beams, and being adapted to receive and convert the radiant energy of each beam into electrical energy to produce electrical output signals representative of said radiant energy received thereby; means for restricting each radiation beam essentially consisting of a shield for said radiation sensitive means, which shield defines a slit portion aligned with said radiation sensitive means substantially at the convergence of said beam paths, said shield adapted to block a portion of each of said radiation beams and to pass a remaining portion to said radiation sensitive means by way of said slit portion; chopper means disposed for sequential and periodic interruption of each of said radiation beams to pulse said beams substantially 180° out of phase; signal transmission means electrically connected to said radiation sensitive means and adapted to transmit pulsed electrical output signals from said radiation sensitive means in a periodic sequence synchronous with interruption of said beams by said chopper means; electrical signal integration means electrically connected to said transmission means and adapted to receive said signals transmitted and to combine said signals to provide a net electrical signal output representative of the net radiation energy of said beams; means to exhibit said net signal output; a pair of prismatic receiver cells adapted to contain portions of said fluid material, each cell including radiation beam entrance and exit windows disposed in spaced relation longitudinally of said cell in opposed, angular relation one to another, each said cell being disposed in substantially coextensive relation to a portion of one of said radiation beam paths and with the exit window thereof directed toward said shield slit portion, whereby a radiation beam directed along its path and through the fluid material contained in said cell is refracted by said material, and whereby changes in the refractive characteristic of said material cause said beam to be deflected with reference to said shield slit portion, thereby to alter the radiant energy received by said radiation sensitive means.

4. An apparatus according to claim 3 which includes a synchronous motor, wherein said chopper means is a semi-circular disc rotatable in periodic sequence through each of said light paths by said motor, and wherein said signal transmission means is a single pole, double throw rotary switch rotatable synchronously with said chopper means by said motor, whereby one beam of said pair is interrupted and the output signal of said radiation sensitive means produced by the other beam is transmitted in said synchronous periodic sequence.

5. An apparatus for determining the refractive characteristic of a fluid material which comprises means for directing each of two monochromatic beams along separate paths; radiation sensitive means disposed in the path of each radiation beam, said radiation sensitive means being the terminal end of said path and being adapted to receive and convert radiant energy into electrical energy to produce an electrical output signal representative of the radiant energy received; means for restricting each said radiation beam essentially consisting of a shield for said radiation sensitive means which shield defines a slit portion aligned in said beam path with said radiation sensitive means, said shield blocking at least a portion of said radiation beam; an electrical system including signal transmission means electrically connected to said radiation sensitive means to transmit the electrical output signals representative of the radiant energy of each beam, in periodic sequence and 180° out of phase, electrical signal integration means connected to said signal transmission means and adapted to receive and combine output signals transmitted from said radiation sensitive means to provide a net electrical signal output representative of the net radiation energy of said beams, and means to exhibit said net signal output; a pair of prismatic receiver cells adapted to contain portions of said fluid material, each cell including radiation beam entrance and exit windows disposed in spaced relation longitudinally of said cell one to another, each said cell being disposed in substantially coextensive relation to a portion of one of said beam paths in advance of said radiation sensitive means and with the exit window thereof directed toward said shield slit portion, whereby a monochromatic radiation beam directed along its path and through the fluid material contained in said cell is refracted by said material, and whereby changes in the refractive characteristic of said material cause said beam to be deflected with reference to said shield slit portion, thereby to alter the radiant energy received by said radiation sensitive means.

6. An apparatus for determining the refractive characteristic of a fluid material which comprises means for directing each of two monochromatic beams along separate paths; radiation sensitive means disposed in the path of each radiation beam, said radiation sensitive means substatially being the terminal end of said path and being adapted to receive and convert radiant energy into electrical energy to produce an electrical output signal representative of the radiant energy received; an electrical system including signal transmission means electrically connected to said radiation sensitive means to transmit the electrical output signals representative of the radiant energy of each beam, in periodic sequence and 180° out of phase, electrical signal integration means connected to said signal transmission means and adapted to receive and combine output signals transmitted from said radiation sensitive means to provide a net electrical signal output representative of the net radiation energy of said beams, and means to exhibit said net signal output; a pair of receiver cells adapted to contain portions of said fluid material, each cell including an open cavity adapted to receive said material, a prism closure for said cavity carried by said cell to provide an interface between said fluid material contained therein and a first surface of said prism, a second prism surface disposed with said cell so as to intercept one of said monochromatic radiation beams and produce incidence of said beam through said prism upon said interface, for reflection therefrom through a third surface of said prism along said beam path, whereby changes in the refractive characteristic of said materials produce changes in the intensity of the radiant energy of said reflected beam received by said radiation sensitive means.

References Cited in the file of this patent

UNITED STATES PATENTS

| | | |
|---|---|---|
| 454,989 | Sonden | June 30, 1891 |
| 2,157,389 | Park | May 9, 1939 |
| 2,166,824 | Runaldue | July 18, 1939 |
| 2,218,357 | Pineo | Oct. 15, 1940 |
| 2,439,373 | Stearns | Apr. 6, 1948 |
| 2,483,102 | Pierson | Sept. 27, 1949 |

OTHER REFERENCES

Karrer et al.: "Photoelectric Refractometer," Journal of the Optical Society of America, vol. 36 pages 42–46, January 1946.